United States Patent
Huang et al.

(10) Patent No.: US 11,746,174 B2
(45) Date of Patent: Sep. 5, 2023

(54) BIODEGRADABLE POLYESTER

(71) Applicant: INDUSTRIAL TECHNOLOGY RESEARCH INSTITUTE, Hsinchu (TW)

(72) Inventors: Shu-Jiuan Huang, Taipei (TW); Shin-Liang Kuo, Hsinchu (TW); Hung Ming Chang, Taichung (TW); Sheng-Lung Chang, Taoyuan (TW); Jin-An Wu, Yunlin County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 393 days.

(21) Appl. No.: 16/952,748

(22) Filed: Nov. 19, 2020

(65) Prior Publication Data

US 2021/0171692 A1 Jun. 10, 2021

Related U.S. Application Data

(60) Provisional application No. 62/937,357, filed on Nov. 19, 2019.

(51) Int. Cl.
| | | |
|---|---|---|
| *C08F 283/02* | (2006.01) | |
| *C08B 3/04* | (2006.01) | |
| *C08B 3/06* | (2006.01) | |
| *C08B 31/00* | (2006.01) | |
| *C08G 63/672* | (2006.01) | |
| *C08G 63/91* | (2006.01) | |
| *C08G 81/00* | (2006.01) | |
| *C08L 87/00* | (2006.01) | |
| *C08L 101/16* | (2006.01) | |
| *C08G 63/668* | (2006.01) | |

(52) U.S. Cl.
CPC ............ *C08F 283/02* (2013.01); *C08B 3/04* (2013.01); *C08B 3/06* (2013.01); *C08B 31/00* (2013.01); *C08G 63/668* (2013.01); *C08G 63/672* (2013.01); *C08G 63/916* (2013.01); *C08G 81/00* (2013.01); *C08L 87/005* (2013.01); *C08L 101/16* (2013.01)

(58) Field of Classification Search
CPC ....... C08B 31/00; C08F 283/02; C08L 101/16
See application file for complete search history.

(56) References Cited

U.S. PATENT DOCUMENTS

| | | | |
|---|---|---|---|
| 5,576,020 A * | 11/1996 | Iritani | C08G 69/44 |
| | | | 424/468 |
| 5,854,368 A | 12/1998 | Iritani et al. | |
| 5,854,369 A | 12/1998 | Geck et al. | |
| 6,562,938 B2 | 5/2003 | Haile et al. | |
| 6,669,771 B2 | 12/2003 | Tokiwa et al. | |
| 7,026,379 B2 | 4/2006 | Oyasato et al. | |
| 7,273,734 B2 | 9/2007 | Minami et al. | |
| 2011/0159100 A1* | 6/2011 | Andersen | A61K 9/2086 |
| | | | 514/282 |
| 2014/0370280 A1 | 12/2014 | Jung et al. | |
| 2015/0005419 A1 | 1/2015 | Jung et al. | |
| 2017/0247155 A1 | 8/2017 | Chaturvedi | |

FOREIGN PATENT DOCUMENTS

| | | |
|---|---|---|
| CN | 102295827 A | 12/2011 |
| CN | 102089386 B | 6/2013 |
| CN | 102260404 B | 8/2014 |
| CN | 108350164 A | 7/2018 |
| KR | 10-1897180 B1 | 9/2018 |
| TW | 291431937 A | 8/2014 |

OTHER PUBLICATIONS

Taiwanese Office Action and Search Report for Taiwanese Application No. 109140519, dated Oct. 4, 2021.
Platnieks, O., et al, "Bio-Based Poly(butylene succinate)/Microcrystalline Cellulose/Nanofibrillated cellulose-based Sustainable Polymer Composites: Thermo-Mechanical and Biodegradation Studies", Polymers, 2020, vol. 12, pp. 1-20.
Zhang, X., et al, "Polybutylene succinate/cellulose nanocrystals: Role of phthalic anhydride in squeeze oriented bionanocomposites", Carbohydrate Polymers, Apr. 2018, vol. 196, pp. 254-261.

* cited by examiner

*Primary Examiner* — Christopher M Rodd
(74) *Attorney, Agent, or Firm* — Birch, Stewart, Kolasch & Birch, LLP

(57) ABSTRACT

A biodegradable polyester is provided. The biodegradable polyester is a transesterification or esterification reaction product of a reactant (a) and a reactant (b). The reactant (a) is a modified linear saccharide oligomer. The reactant (b) is a polyester, or the reactant (b) includes a dicarboxylic acid and a diol. The modified saccharide oligomer is a reaction product of a saccharide oligomer and a modifier.

12 Claims, No Drawings

BIODEGRADABLE POLYESTER

CROSS REFERENCE TO RELATED APPLICATIONS

This application claims the benefit of U.S. Provisional Application No. 62/937,357, filed on Nov. 19, 2019, which is hereby incorporated herein by reference.

TECHNICAL FIELD

The disclosure relates to a biodegradable polyester.

BACKGROUND

The rise of plastic packaging material is closely related to a general change of lifestyle. The use of light, convenient packaging for food storage and transportation, as well as increasing the shelf life of food, has become very important due to pressure from high population growth rates and food shortages. Although plastic packaging at present can satisfy demand, the consumption of plastic has exceeded 160 million tons annually, of which 35% is used as packaging material. The treatment of waste from packaging material has a huge impact on the environment, so recycling plastic and studying degradable plastic have become more and more important.

Biodegradable material has been generally defined as a material under sufficient water, oxygen, and suitable nutrients and temperature being able to decompose into carbon dioxide and water by microbes. Biodegradable material is a new type of polymer, which is characterized by the self-decomposition when its function completes. The bonding between these polymers decomposes into environmentally friendly compositions through biological processes. Currently, mainstream biodegradable materials include polylactic acid (PLA), poly(butyleneadipate-co-terephthalate) (PBAT), or PLA-starch-blending (or PBAT-starch-blending) materials. The conventional biodegradable materials, however, would be completely decomposed under industrial composting conditions, and exhibit poor thermal resistance and mechanical properties in comparison with common packaging materials (such as polyethylene (PE) or polypropylene (PP)), thereby limiting the application thereof.

Therefore, a novel biodegradable material is called for to solve the aforementioned problems.

SUMMARY

According to embodiments of the disclosure, the disclosure provides a biodegradable polyester. The biodegradable polyester can be a transesterification reaction product or esterification reaction product of a reactant (A) and a reactant (B). In particular, the reactant (A) can be a modified saccharide oligomer, and the reactant (B) can be a polyester. According to some embodiments of the disclosure, the reactant (B) can consist of a dicarboxylic acid and a dihydric alcohol.

A detailed description is given in the following embodiments.

DETAILED DESCRIPTION

The biodegradable polyester of the disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. As used herein, the term "about" in quantitative terms refers to plus or minus an amount that is general and reasonable to persons skilled in the art.

The disclosure provides a biodegradable polyester. According to embodiments of the disclosure, the biodegradable polyester can be decomposed in an environment at room temperature (i.e. decomposed in the absence of an industrial composting system) and exhibits superior mechanical properties. According to embodiments of the disclosure, the biodegradable polyester of the disclosure is prepared by reacting a modified saccharide oligomer with a polyester (or dicarboxylic acid and dihydric alcohol) via a transesterification or esterification reaction. The compatibility between the saccharide oligomer and the reactant (B) is poor and the saccharide oligomer is not apt to react with the reactant (B) due to the molecular polarity difference between the saccharide oligomer and the reactant (B). Therefore, the disclosure discloses that the compatibility between the saccharide oligomer and the reactant (B) is improved by specific modification of the saccharide oligomer. Since the modified saccharide oligomer (such as modified cellulose or chitosan) used for preparing the biodegradable polyester has a specific weight average molecular weight and a specific average degree of substitution, the biodegradable polyester of the disclosure exhibits a degradability at room temperature and a superior mechanical properties.

According to embodiments of the disclosure, the biodegradable polyester of the disclosure can be a transesterification reaction product or esterification reaction product of a reactant (A) and a reactant (B). According to embodiments of the disclosure, the reactant (A) can be a modified saccharide oligomer (such as modified linear saccharide oligomer), and the reactant (B) can be a polyester. According to some embodiments of the disclosure, the reactant (B) can consist of a dicarboxylic acid and a dihydric alcohol.

According to embodiments of the disclosure, the biodegradable polyester of the disclosure can be a reaction product of a composition, such as a reaction product of a composition via a transesterification reaction of esterification reaction. The composition includes a reactant (A) and a reactant (B). According to some embodiments of the disclosure, the composition consists of the reactant (A) and the reactant (B).

According to embodiments of the disclosure, the weight ratio of the reactant (A) to the reactant (B) can be about 1:100 to 30:100, such as 1.5:100, 2:100, 3:100, 4:100, 5:100, 6:100, 7:100, 8:100, 9:100, 10:100, 11:100, 12:100, 13:100, 14:100, 15:100, 16:100, 17:100, 18:100, 19:100, 20:100, 21:100, 22:100, 23:100, 24:100, 25:100, 26:100, 27:100, 28:100 or 29:100. The biodegradability and mechanical properties of the biodegradable polyester of the disclosure can be adjusted via the weight ratio of the reactant (A) to the reactant (B). The biodegradable polyester exhibits better biodegradability with the increase of the weight ratio of the reactant (A) to the reactant (B). If the weight ratio of the reactant (A) to the reactant (B) is too low, the biodegradable polyester exhibits poor biodegradability, and thus the biodegradable polyester is not apt to be decomposed in an environment at room temperature. If the weight ratio of the reactant (A) to the reactant (B) is too high, the biodegradable polyester exhibits poor mechanical properties.

According to embodiments of the disclosure, the modified saccharide oligomer of the disclosure can be a reaction product of a linear saccharide oligomer and a modifier via an esterification or condensation reaction. Namely, the modified saccharide oligomer of the disclosure is obtained by modifying a linear saccharide oligomer with a modifier. According to embodiments of the disclosure, the saccharide oligomer can be a cellulose oligomer, dextrin, chitosan, or a combination thereof. According to embodiments of the disclosure, the saccharide oligomer can be a saccharide oligomer having at least one repeating unit of

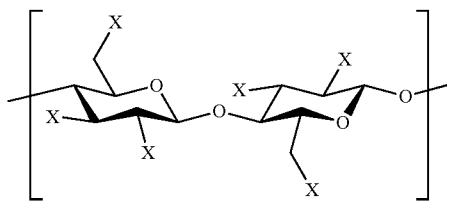

repeating unit, a saccharide oligomer having at least one repeating unit, or a combination thereof, wherein X are independently —OH or —NH$_2$.

According to embodiments of the disclosure, the modifier can be carboxylic acid, anhydride, siloxane having at least one reactive functional group, or a combination thereof, wherein the reactive functional group is acrylate group, methacrylate group, glycidyl group, oxiranyl group, oxetanyl group, or 3,4-epoxycyclohexyl group. When the modifier is a carboxylic acid, the carboxylic acid can be a linear or branched $C_{1-8}$ carboxylic acid, such as formic acid, acetic acid, propionic acid, butyric acid (such as n-butyric acid or isobutyric acid), valeric acid, caproic acid, heptanoic acid, or caprylic acid (such as n-caprylic acid or isocaprylic acid). In addition, the carboxylic acid can be a carboxylic acid having an aryl group, such as benzoic acid. When the modifier is a carboxylic acid anhydride, the carboxylic acid anhydride can be linear, cyclic or branched $C_{2-18}$ carboxylic acid anhydride, such as acetic anhydride, succinic anhydride, maleic anhydride, 3-dodecyloxolane-2,5-dione, tetradecylsuccinicanhydride, methacrylic anhydride, phthalic anhydride or benzoic anhydride. When the modifier is a siloxane having at least one reactive functional group, the siloxane having at least one reactive functional group can be 3-glycidyloxypropyl)trimethoxysilane, 3-glycidyloxypropyltriethoxysilane, 3-(trimethoxysilyl)propyl methacrylate, 3-(triethoxysilyl)propyl methacrylate, 3-(trimethoxysilyl)propyl acrylate, 3-(triethoxysilyl)propyl acrylate, [2-(3,4-epoxycyclohexyl)ethyl]trimethoxysilane, or [2-(3,4-epoxycyclohexyl)ethyl]triethoxysilane.

According to embodiments of the disclosure, the modifier can be formic acid, acetic acid, propionic acid, butyric acid, valeric acid, caproic acid, heptanoic acid, caprylic acid, benzoic acid, acetic anhydride, succinic anhydride, maleic anhydride, 3-dodecyloxolane-2,5-dione, tetradecylsuccinicanhydride, methacrylic anhydride, phthalic anhydride, benzoic anhydride, 3-glycidyloxypropyl)trimethoxysilane, 3-glycidyloxypropyltriethoxysilane, 3-(trimethoxysilyl)propyl methacrylate, 3-(triethoxysilyl)propyl methacrylate, 3-(trimethoxysilyl)propyl acrylate, 3-(triethoxysilyl)propyl acrylate, [2-(3,4-epoxycyclohexyl)ethyl]trimethoxysilane, [2-(3,4-epoxycyclohexyl)ethyl]triethoxysilane, or a combination thereof.

According to embodiments of the disclosure, the weight average molecular weight (Mw) of the modified saccharide oligomer is directly proportional to the weight average molecular weight (Mw) of the saccharide oligomer which is used to react with the modifier. According to embodiments of the disclosure, the weight average molecular weight of the modified saccharide oligomer (Mw) can be about 500 to 15,000, such as about 800 to 15,000, 1,000 to 14,000, 1,200 to 13,000, or 1,500 to 12,000. If the weight average molecular weight of the modified saccharide oligomer is too low, the modified saccharide oligomer exhibits poor heat resistance, thereby reducing the mechanical properties, heat resistance and weight average molecular weight of the biodegradable polyester. If the weight average molecular weight of the modified saccharide oligomer is too high, the modified saccharide oligomer is not apt to react with the reactant (B) to undergo a transesterification or esterification, thereby inhibiting the formation of the biodegradable polyester. Thus, the modified saccharide oligomer is mixed with the reactant (B), rather than being reacted with the reactant (B).

According to embodiments of the disclosure, the weight average molecular weight (Mw) of the oligomer or polymer as disclosed by the disclosure is determined by gel permeation chromatography (GPC) based on a polystyrene calibration curve. According to embodiments of the disclosure, each anhydroglucose unit (AGU) of the modified saccharide oligomer has an average degree of substitution from about 0.5 to 2.5, such as about 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, or 2.4. Each anhydroglucose unit (AGU) of the saccharide oligomer (i.e. unmodified saccharide oligomer) of the disclosure can have hydroxyl group and/or amine group, and the total number of hydroxyl group and/or amine group can be 3. The average degree of substitution (of the modified saccharide oligomer) means the average number of hydroxyl group and/or amine group which is replaced with a modified group, after reacting the saccharide oligomer with the modifier. Herein, the average degree of substitution of each anhydroglucose unit (AGU) of the modified saccharide oligomer can be determined by the integrated intensity of $^1$H-NMR (nuclear magnetic resonance spectroscopy).

According to embodiments of the disclosure, while the saccharide oligomer is modified by a modifier, the hydroxyl group and/or amine group of the anhydroglucose unit can be replaced with a modified group, wherein the modified

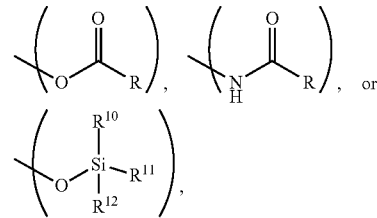

wherein R is hydrogen, $C_{1-8}$ $_{alkyl}$ group, aryl group or $C_{2-18}$ carboxyl group; $R^{10}$, $R^{11}$ and $R^{12}$ are independently $C_{1-8}$ $_{alkyl}$ group, $C_{1-8}$ alkoxy group or ‑(Z—$R^{13}$); Z is single bond, unsubstituted $C_{1-8}$ alkylene group or substituted $C_{2-8}$ alkylene group; $R^{13}$ is acrylate group, methacrylate group, glycidyl group, oxiranyl group, oxetanyl group, 3,4-epoxycyclohexyl group or glycidyloxypropyl group; and at least one of $R^{10}$, $R^{11}$ and $R^{12}$ is ‑(Z—$R^{13}$). According to embodiments of the disclosure, the unsubstituted $C_{1-8}$ alkylene group can be linear or branched alkylene group. For example, $C_{1-8}$ alkylene group can be methylene group, ethylene group, propylene group, butylene group, pentylene group, hexylene group, heptylene group, octylene group or an isomer thereof. According to embodiments of the disclosure, when Z is the substituted $C_{2-8}$ alkylene group, at least one —$CH_2$— of the alkylene group can be replaced with —O—, —CO—, —OCO—, —COO—, —CONH— or —NHCO—. According to embodiments of the disclosure, $C_{1-8}$ alkyl group can be linear or branched alkyl group. For example, $C_{1-8}$ alkyl group can be methyl, ethyl, propyl, butyl, pentyl, hexyl, heptyl, octyl or an isomer thereof. According to embodiments of the disclosure, $C_{1-8}$ alkoxy group can be linear or branched alkyl group. For example, $C_{1-8}$ alkoxy group can be methoxy, ethoxy, propoxy, butoxy, pentoxy, hexoxy, heptoxy or octoxy.

According to embodiments of the disclosure, if the average degree of substitution of each anhydroglucose unit (AGU) of the modified saccharide oligomer is too low, the modified saccharide oligomer would be not apt to react with a reactant (B) to undergo a transesterification or esterification reaction, and the obtained biodegradable polyester exhibits poor biodegradability. If the average degree of substitution of each anhydroglucose unit (AGU) of the modified saccharide oligomer is too high, the properties of the biodegradable polyester would be deeply affected by the modified groups. For example, when the modified group is

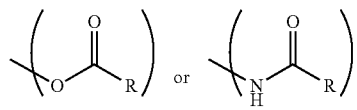

or H and R is $C_{2-8\ alkyl}$ group, the hydrophobicity of the biodegradable polyester would be increased due to the higher average degree of substitution, thereby reducing the biodegradability of the biodegradable polyester.

According to embodiments of the disclosure, the modified saccharide oligomer can be a saccharide oligomer having at least one repeating unit of Formula (I), a saccharide oligomer having at least one repeating unit of Formula (II), or a combination thereof Formula (I)

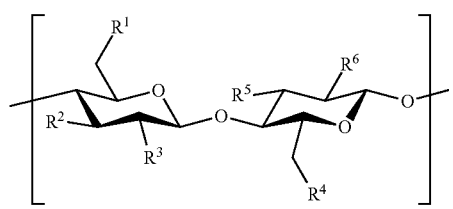

Formula (II)

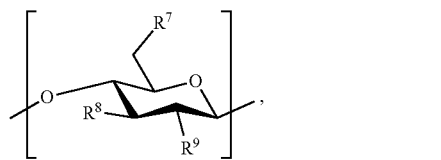

wherein $R^1$, $R^2$, $R^3$, $R^4$, $R^5$, $R^6$, $R^7$, $R^8$ and $R^9$ are independently —OH, —$NH_2$,

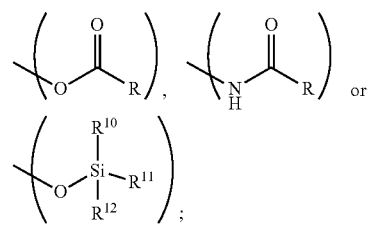

at least one of $R^1$, $R^2$, $R^3$, $R^4$, $R^5$ and $R^6$ is

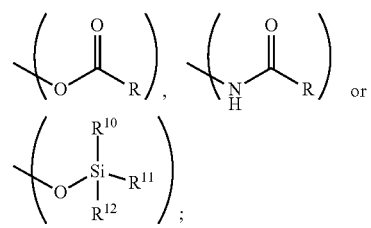

at least one of $R^7$, $R^8$, $R^9$ is

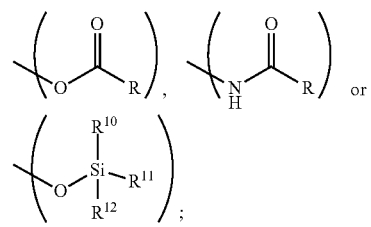

R is hydrogen, $C_{1-8}$ alkyl group, aryl group or $C_{2-18}$ carboxyl group; $R^{10}$, $R^{11}$ and $R^{12}$ are independently $C_{1-8}$ alky group, $C_{1-8}$ alkoxy group or —(Z—$R^{13}$); Z is single bond, unsubstituted $C_{1-8}$ alkylene group or substituted $C_{2-8}$ alkylene group. When Z is the substituted $C_{2-8}$ alkylene group, at least one —$CH_2$— of the alkylene group can be replaced with —O—, —CO—, —OCO—, —COO—, —CONH— or —NHCO—. $R^{13}$ is acrylate group, methacrylate group, glycidyl group, oxiranyl group, oxetanyl group, 3,4-epoxycyclohexyl group or glycidyloxypropyl group; and at least one of $R^{10}$, $R^{11}$ and $R^{12}$ is —(Z—$R^{13}$).

According to embodiments of the disclosure, when R is $C_{1-8\ alkyl}$ group, the hydrophobicity of the biodegradable polyester of the disclosure can be adjusted by increasing the carbon number of the alkyl group. When the alkyl group has large carbon number, the biodegradable polyester of the disclosure exhibits higher hydrophobicity. When the biodegradable polyester of the disclosure exhibits higher hydrophobicity, the biodegradability of the biodegradable polyester of the disclosure is reduced.

According to embodiments of the disclosure, when the reactant (B) consists of dicarboxylic acid and dihydric alcohol, the modified saccharide oligomer can react with the dihydric alcohol and dicarboxylic acid to undergo a copolymerization. According to embodiments of the disclosure, when the reactant (B) is polyester, the modified saccharide oligomer can react with the polyester to undergo a copolymerization (such as melt copolymerization). According to embodiments of the disclosure, the dicarboxylic acid can be a compound having a structure represented by Formula (III)

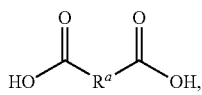

wherein $R^a$ is unsubstituted $C_{1-8}$ alkylene group or phenylene group. For example, the dicarboxylic acid can be malonic acid, succinic acid, glutaric acid, adipic acid, pimelic acid, suberic acid, terephthalic acid or isophthalic acid. According to embodiments of the disclosure, the dihydric alcohol can be a compound having a structure represented by Formula (IV)

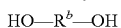

wherein $R^b$ is unsubstituted $C_{1-8}$ alkylene group or phenylene group. For example, the dihydric alcohol can be ethylene glycol, propylene glycol, butanediol, pentanediol, hexanediol, heptanediol, octanediol or hydroquinone. According to embodiments of the disclosure, the molar ratio of the dicarboxylic acid to the dihydric alcohol can be about 1.4:1 to 1:1.4.

According to embodiments of the disclosure, the polyester has at least one repeating unit of Formula (V)

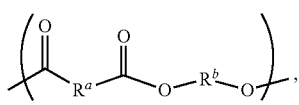

wherein $R^a$ and $R^b$ are independently unsubstituted $C_{1-8}$ alkylene group or phenylene group. According to embodiments of the disclosure, the polyester is polybutylene succinate (PBS), polybutylene succinate adipate (PBSA), polyethylene succinate (PES), polybutylene adipate/terephthalate (PBAT), or a combination thereof. According to embodiments of the disclosure, the weight average molecular weight (Mw) of polyester can be about 500 to 100,000, such as about 800 to 90,000, 1,000 to 80,000, 2,000 to 80,000, 3,000 to 80,000, 4,000 to 80,000 or 5,000 to 70,000.

According to embodiments of the disclosure, the weight average molecular weight (Mw) of the biodegradable polyester can be about 5,000 to 5,000,000, such as about 10,000 to 3,000,000, 50,000 to 2,000,000 or 80,000 to 1,000,000.

According to embodiments of the disclosure, the method for preparing the modified saccharide oligomer of the disclosure can include following steps. First, a linear saccharide oligomer, a modifier, and a catalyst are mixed and reacted at 20° C.-100° C. for 0.5-8 hours, wherein the molar ratio of the linear modifier to the anhydroglucose unit (AGU) of the saccharide oligomer can be 1:2 to 6:1, such as 1:1, 2:1, 3:1, 4:1 or 5:1. In addition, when the modifier serves as a solvent simultaneously, the molar ratio of the linear modifier to the anhydroglucose unit (AGU) of the saccharide oligomer can be greater than 6:1. The amount of catalyst can be 0.1 wt % to 30 wt %, based on the weight of the linear saccharide oligomer. According to embodiments of the disclosure, the degree of substitution of each anhydroglucose unit (AGU) of the obtained modified saccharide oligomer is directly proportional to the molar ratio of the linear modifier to the anhydroglucose unit (AGU) of the saccharide oligomer. According to embodiments of the disclosure, the catalyst can be conventional esterification catalyst, such as organic zinc compound, organic titanium compound, organic tin compound, sulfuric acid, potassium hydroxide, potassium carbonate, 4-dimethylaminopyridine (DMAP), or a combination thereof. Next, the result is precipitated and washed with acetone. After filtering and drying, the modified saccharide oligomer is obtained.

According to embodiments of the disclosure, the linear saccharide oligomer can be cellulose oligomer. For example, the method for preparing the cellulose oligomer can include following steps. A lumber pulp is added into a phosphoric acid, and then the obtained solution is stirred at room temperature. Next, after heating the obtained solution at 20-100° C. for 1-8 hours, the result is washed with tetrahydrofuran (THF) and water alternately, and the cellulose oligomer (white powder) is obtained after drying. Herein, the weight average molecular weight of the obtained cellulose oligomer is affected by the reaction temperature and reaction time. For example, the weight average molecular weight of the obtained cellulose oligomer reduces as the increase of reaction temperature or reaction time.

According to embodiments of the disclosure, the biodegradable polyester of the disclosure can be obtained by reacting the reactant (A) with the reactant (B) at 150-270° C. for 1-8 hours.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example 1

50 g of bleached wood pulp (commercially available from China Pulp & Paper Industry) was added into a phosphoric acid solution (600 mL), and the obtained mixture was stirred at room temperature for 0.5 hours. Next, the obtained solution was heated at 80° C. for 8 hours, and the result was washed with tetrahydrofuran (THF) and water alternately. After drying, Cellulose oligomer (1) (white powder) was obtained.

Preparation Example 2

Preparation Example 2 was performed in the same manner as in Preparation Example 1, except that the reaction time was reduced from 8 hours to 4 hours, obtaining Cellulose oligomer (2).

Preparation Example 3

Preparation Example 3 was performed in the same manner as in Preparation Example 1, except that the reaction time was reduced from 8 hours to 2 hours, obtaining Cellulose oligomer (3).

Preparation Example 4

Preparation Example 4 was performed in the same manner as in Preparation Example 1, except that the reaction time was reduced from 8 hours to 1 hour, obtaining Cellulose oligomer (4). The weight average molecular weight of Cellulose oligomers (1)-(4) of Preparation Examples 1-4 is shown in Table 1.

TABLE 1

|  | reaction time | reaction temperature | weight average molecular weight |
|---|---|---|---|
| Cellulose oligomer (1) | 8 hours | 80° C. | about 820 |
| Cellulose oligomer (2) | 4 hours | 80° C. | about 2,000 |
| Cellulose oligomer (3) | 2 hours | 80° C. | about 5,000 |
| Cellulose oligomer (4) | 1 hours | 80° C. | about 12,000 |

As shown in Table 1, the weight average molecular weight of the obtained cellulose oligomer can be controlled by adjusting the reaction time and temperature of the reaction of the wood pulp and phosphoric acid.

Preparation Example 5

Cellulose oligomer (1) of Preparation Example 1, acetic anhydride (serving as modifier), concentrated sulfuric acid, and acetic acid were mixed, wherein the molar ratio of the modifier to the anhydroglucose unit (AGU) of Cellulose oligomer (1) was 2:1, and the additional amount of the concentrated sulfuric acid was 20 wt % (based on the weight of Cellulose oligomer (1)). Next, the obtained mixture was reacted at 80° C. After reacting for 4 hours, the obtained result was precipitated and washed with acetone. After filtering and drying, modified Cellulose oligomer (1) was obtained.

Preparation Example 6

Preparation Example 6 was performed in the same manner as in Preparation Example 5, except that the molar ratio of the modifier to the anhydroglucose unit (AGU) of Cellulose oligomer (1) was altered from 2:1 to 3:1, obtaining modified Cellulose oligomer (2).

Preparation Example 7

Preparation Example 7 was performed in the same manner as in Preparation Example 5, except that Cellulose oligomer (1) of Preparation Example 1 was replaced with Cellulose oligomer (2), obtaining modified Cellulose oligomer (3).

Preparation Example 8

Cellulose oligomer (2) of Preparation Example 2, formic acid (serving as modifier and solvent), and zinc isooctanoate were mixed, wherein the molar ratio of formic acid to anhydroglucose unit (AGU) of Cellulose oligomer (2) was 40:1, and the additional amount of zinc isooctanoate was 5 wt % (based on the weight of Cellulose oligomer (2)). Next, the obtained mixture was reacted at 80° C. After reacting for 4 hours, the obtained result was precipitated and washed with acetone. After filtering and drying, obtaining modified Cellulose oligomer (4).

Preparation Example 9

Preparation Example 9 was performed in the same manner as in Preparation Example 8, except that Cellulose oligomer (2) of Preparation Example 2 was replaced with Cellulose oligomer (3) of Preparation Example 3, obtaining modified Cellulose oligomer (5).

Preparation Example 10

Preparation Example 10 was performed in the same manner as in Preparation Example 9, except that the molar ratio of formic acid to anhydroglucose unit (AGU) of Cellulose oligomer (3) was altered from 40:1 to 50:1, obtaining modified Cellulose oligomer (6).

Preparation Example 11

Cellulose oligomer (4) of Preparation Example 4, formic acid, and zinc isooctanoate (serving as catalyst) were mixed, wherein the molar ratio of formic acid to anhydroglucose unit (AGU) of Cellulose oligomer (4) was 40:1, and the additional amount of zinc isooctanoate was 5 wt % (based on the weight of Cellulose oligomer (4)). Next, the obtained mixture was reacted at 80° C. After reacting for 4 hours, the obtained result was precipitated and washed with acetone. After filtering and drying, modified Cellulose oligomer (7) was obtained.

Preparation Example 12

Cellulose oligomer (1) of Preparation Example 1, 3-glycidyloxypropyltrimethoxysilane (with a trade number of XIAMETER®OFS-6040) (serving as modifier) and isopropanol were mixed, wherein the molar ratio of the modifier to the anhydroglucose unit (AGU) of Cellulose oligomer (1) was 1.8:1. Next, the obtained mixture was reacted at 80° C. After reacting for 6 hours, the obtained result was precipitated and washed with acetone. After filtering and drying, modified Cellulose oligomer (8) was obtained. The average degree of substitution of anhydroglucose unit (AGU) of modified Cellulose oligomers (1)-(8) of Preparation Example 5-12 is shown in Table 2.

Preparation Example 13

Preparation Example 13 was performed in the same manner as in Preparation Example 5, except that cellulose oligomer (1) was replaced with maltodextrin (commercially available from San Fu Chemical Co Ltd with a weight average molecular weight of about 1500), obtaining modified Dextrin (1).

Preparation Example 14

Preparation Example 14 Preparation Example 8 was performed in the same manner as in, except that Cellulose oligomer (1) was replaced with maltodextrin (commercially available from San Fu Chemical Co Ltd with a weight average molecular weight of about 1500), obtaining modified Dextrin (2).

Preparation Example 15

Maltodextrin (commercially available from San Fu Chemical Co Ltd with a weight average molecular weight of about 1500) was added into 1-methyl-2-pyrrolidinone, and the result was mixed by a homogenizer at 30-80° C., forming a first solution. Maleic anhydride (serving as modifier), 4-dimethylaminopyridine (DMAP) and 1-methyl-2-pyrrolidinone were mixed at 20-50° C., forming a second solution, wherein the molar ratio of the modifier to anhydroglucose unit (AGU) of maltodextrin was 5:1, and the additional amount of 2,4-dimethylaminopyridine (DMAP) was 3.8 wt % (based on the weight of maltodextrin). Next, the first solution was heated to 80-100° C., and then the second solution was added into the first solution. After reacting for 2 hours, the obtained result was precipitated and washed with acetone. After filtering and drying, modified Dextrin (3) was obtained. The average degree of substitution of anhydroglucose unit (AGU) of modified Dextrin (1)-(3) of Preparation Examples 13-15 is shown in Table 2.

TABLE 2

| | saccharide oligomer | modifier | average degree of substitution of anhydroglucose unit (AGU) |
|---|---|---|---|
| modified Cellulose oligomer (1) | Cellulose oligomer (1) | acetic anhydride | about 0.8 |
| modified Cellulose oligomer (2) | Cellulose oligomer (1) | acetic anhydride | about 2.5 |
| modified Cellulose oligomer (3) | Cellulose oligomer (2) | acetic anhydride | about 0.8 |
| modified Cellulose oligomer (4) | Cellulose oligomer (2) | formic acid | about 1.5 |
| modified Cellulose oligomer (5) | Cellulose oligomer (3) | formic acid | about 1.5 |
| modified Cellulose oligomer (6) | Cellulose oligomer (3) | formic acid | about 1.8 |
| modified Cellulose oligomer (7) | Cellulose oligomer (4) | formic acid | about 1.9 |
| modified Cellulose oligomer (8) | Cellulose oligomer (1) | 3-glycidyloxypropyl-trimethoxysilane | about 0.8 |
| modified Dextrin (1) | maltodextrin | acetic anhydride | about 1.2 |
| modified Dextrin (2) | maltodextrin | formic acid | about 1.8 |
| modified Dextrin (3) | maltodextrin | maleic anhydride | about 0.8 |

Preparation Example 16

Succinic acid (2.5 mole), 1,6-adipic acid (0.4 mole), 1,4-butanediol (3.77 mole) and tetrabutyl titanate (catalytic amount) were added into a reaction tank and reacted at 150-170° C. to perform an esterification. After reacting for 8 hours, the product was subjected to a dehydration process, obtaining Polyester (1).

Preparation Example 17

Succinic acid (2.9 mole), 1,4-butanediol (3.77 mole) and tetrabutyl titanate (catalytic amount) were added into a reaction tank and reacted at 150-170° C. to perform an esterification. After reacting for 8 hours, the product was subjected to a dehydration process, obtaining Polyester (2).

Example 1

3 parts by weight of modified Cellulose oligomer (1) and 100 parts by weight polyester (1) were mixed. Next, the mixture was reacted at 200° C. to perform a melt reaction for 1.5 hours, obtaining Biodegradable polyester (1). Next, a dumbbell test piece of Biodegradable polyester (1) was formed by injection molding, and the tensile strength and elongation at break of the dumbbell test piece were measured. Furthermore, Biodegradable polyester (1) was subjected to a hot press and the result was cut to form Sample (1) (with a thickness about 100 μm, and a size of 5 cm×5 cm). Next, Sample (1) was subjected to a biodegradation test, and the result is shown in Table 3.

The tensile strength and elongation at break are determined by the method according to JIS K 7127. The biodegradation test (in an environment at room temperature) includes following steps. A potting soil (commercially available from Fwusow Industry Co., Ltd. with a trade number of organic soil mixture (7-03)) and a fertilizer (commercially available from Fwusow Industry Co., Ltd. with a trade number of normal compost (5-10)) were mixed, wherein the weight ratio of the potting soil to the fertilizer was 3:1. Next, deionized water was added into the mixture, obtaining a soil for biodegradation test (with a pH value of about 6-7), wherein the water content of the solid was 50 wt %, based on the weight of the soil for biodegradation test. Next, the sample was disposed in the soil and all the surface of the sample contacted the soil. After disposing the sample in the soil at room temperature (25° C.) for 12 weeks, the sample was cleaned and weighed to measure the weight loss.

Example 2

Example 2 was performed in the same manner as in Example 1, except that modified Cellulose oligomer (1) was replaced with modified Cellulose oligomer (2), obtaining Biodegradable polyester (2). Next, a dumbbell test piece of Biodegradable polyester (2) was formed by injection molding, and the tensile strength and elongation at break of the dumbbell test piece were measured. Furthermore, Biodegradable polyester (2) was subjected to a hot press and the result was cut to form Sample (2) (with a thickness about 100 μm, and a size of 5 cm×5 cm). Next, Sample (2) was subjected to a biodegradation test, and the result is shown in Table 3.

Example 3

Example 3 was performed in the same manner as in Example 1, except that modified Cellulose oligomer (1) was replaced with modified Cellulose oligomer (3), obtaining Biodegradable polyester (3). Next, a dumbbell test piece of Biodegradable polyester (3) was formed by injection molding, and the tensile strength and elongation at break of the dumbbell test piece were measured. Furthermore, Biodegradable polyester (3) was subjected to a hot press and the result was cut to form Sample (3) (with a thickness about 100 μm, and a size of 5 cm×5 cm). Next, Sample (3) was subjected to a biodegradation test, and the result is shown in Table 3.

Example 4

Example 4 was performed in the same manner as in Example 1, except that modified Cellulose oligomer (1) was replaced with modified Cellulose oligomer (4), obtaining Biodegradable polyester (4). Next, a dumbbell test piece of Biodegradable polyester (4) was formed by injection molding, and the tensile strength and elongation at break of the dumbbell test piece were measured. Furthermore, Biodegradable polyester (4) was subjected to a hot press and the result was cut to form Sample (4) (with a thickness about 100 μm, and a size of 5 cm×5 cm). Next, Sample (4) was subjected to a biodegradation test, and the result is shown in Table 3.

Example 5

Example 5 was performed in the same manner as in Example 4, except that the additional amount of modified Cellulose oligomer (4) was increased from 3 parts by weight to 5 parts by weight, obtaining Biodegradable polyester (5). Next, a dumbbell test piece of Biodegradable polyester (5) was formed by injection molding, and the tensile strength and elongation at break of the dumbbell test piece were measured. Furthermore, Biodegradable polyester (5) was subjected to a hot press and the result was cut to form Sample (5) (with a thickness about 100 μm, and a size of 5 cm×5 cm). Next, Sample (5) was subjected to a biodegradation test, and the result is shown in Table 3.

TABLE 3

|  | modified cellulose oligomer:polyester (1) | average degree of substitution of modified cellulose oligomer | tensile strength (GPa) | elongation at break(%) | weight loss (%) |
|---|---|---|---|---|---|
| Example 1 | 3:100 | 0.8 | 20.8 | 378 | 6.5 |
| Example 2 | 3:100 | 2.5 | 20.7 | 370 | 1.2 |
| Example 3 | 3:100 | 0.8 | 20.0 | 458 | 6.0 |
| Example 4 | 3:100 | 1.5 | 20.3 | 481 | 6.8 |
| Example 5 | 5:100 | 1.5 | 19.9 | 460 | 7.3 |

As shown in Table 3, the biodegradable polyester of the disclosure can be decomposed at room temperature (25° C.). When the modified cellulose oligomer has acetate group, in comparison with the biodegradable polyester of Example 2, the biodegradable polyester of Example 1 exhibits biodegradable properties. Therefore, the biodegradable properties of the biodegradable polyester of the disclosure can be modified by adjusting average degree of substitution of modified cellulose oligomer. In comparison with Example 1, since the modified cellulose oligomer (used for preparing the biodegradable polyester of Example 3) has higher modified cellulose oligomer, the obtained biodegradable polyester exhibits superior mechanical properties. As shown in Examples 4 and 5, the biodegradable polyester exhibits superior biodegradable properties with the increase of the amount of the modified cellulose oligomer.

Comparative Example 1

A dumbbell test piece of 100 parts by weight polybutylene succinate adipate (PBSA) (the weight ratio of succinic acid to adipic acid was 87/13) (with a weight average molecular weight of about 78,000) was formed by injection molding, and the tensile strength and elongation at break of the dumbbell test piece were measured. Furthermore, PBSA was subjected to a hot press and the result was cut to form Sample (6) (with a thickness about 100 μm, and a size of 5 cm×5 cm). Next, Sample (6) was subjected to a biodegradation test, and the result is shown in Table 4.

Comparative Example 2

3 parts by weight of cellulose nanocrystal (commercially available from Celluforce) and 100 parts by weight of polybutylene succinate adipate (PBSA) (the weight ratio of succinic acid to adipic acid was 87/13) (with a weight average molecular weight of about 78,000) were blended by a twin-screw blender, obtaining Composite (1). Herein, the cellulose nanocrystal was merely physically mixed with polybutylene succinate adipate (PBSA). Next, a dumbbell test piece of Composite (1) was formed by injection molding, and the tensile strength and elongation at break of the dumbbell test piece were measured. Furthermore, Composite (1) was subjected to a hot press and the result was cut to form Sample (7) (with a thickness about 100 μm, and a size of 5 cm×5 cm). Next, Sample (7) was subjected to a biodegradation test, and the result is shown in Table 4.

Comparative Example 3

Cellulose nanocrystal (commercially available from Celluforce), acetic anhydride (serving as modifier), concentrated sulfuric acid, and acetic acid were mixed, wherein the molar ratio of the modifier to the anhydroglucose unit (AGU) of crystalline cellulose was 5:1, and the additional amount of the concentrated sulfuric acid was 20 wt % (based on the total weight of crystalline cellulose and acetic anhydride). Next, the obtained mixture was reacted at 80° C. After reacting for 4 hours, the obtained result was precipitated and washed with acetone. After filtering and drying, a modified crystalline cellulose was obtained.

3 parts by weight of the modified cellulose nanocrystal and 100 parts by weight of polybutylene succinate adipate (PBSA) (the weight ratio of succinic acid to adipic acid was 87/13) (with a weight average molecular weight of about 78,000) were blended by a twin-screw blender, obtaining Composite (2). Herein, the crystalline cellulose was merely physically mixed with polybutylene succinate adipate (PBSA). Next, a dumbbell test piece of Composite (2) was formed by injection molding, and the tensile strength and elongation at break of the dumbbell test piece were measured. Furthermore, Composite (2) was subjected to a hot press and the result was cut to form Sample (8) (with a thickness about 100 μm, and a size of 5 cm×5 cm). Next, Sample (8) was subjected to a biodegradation test, and the result is shown in Table 4.

Comparative Example 4

Comparative Example 4 was performed in the same manner as in Comparative Example 3, except that the amount of the modified cellulose nanocrystal was increased from 3 parts by weight to 5 parts by weight, obtaining Composite (3). Next, a dumbbell test piece of Composite (3) was formed by injection molding, and the tensile strength and elongation at break of the dumbbell test piece were measured. Furthermore, Composite (3) was subjected to a hot press and the result was cut to form Sample (9) (with a thickness about 100 μm, and a size of 5 cm×5 cm). Next, Sample (9) was subjected to a biodegradation test, and the result is shown in Table 4.

TABLE 4

|  | tensile strength (GPa) | elongation at break(%) | weight loss (%) |
|---|---|---|---|
| Example 1 | 20.8 | 378 | 6.5 |
| Comparative Example 1 | 21.1 | 399 | 1.6 |
| Comparative Example 2 | 21.8 | 439 | 2.0 |

TABLE 4-continued

|  | tensile strength (GPa) | elongation at break(%) | weight loss (%) |
|---|---|---|---|
| Comparative Example 3 | 22.4 | 369 | 1.2 |
| Comparative Example 4 | 21.5 | 285 | 1.5 |

In comparison with Comparative Example 1, since the biodegradable polyester of the disclosure is prepared from the modified cellulose oligomer and a polyester via transesterification or esterification reaction, the biodegradable properties of the biodegradable polyester of the disclosure can be improved on the premise that the mechanical properties of biodegradable polyester is not reduced greatly. In addition, as shown in Comparative Example 2, the biodegradable properties of the obtained composite are not improved even though blending the cellulose with polyester. Furthermore, as shown in Comparative Example 3 and Comparative Example 4, the biodegradable properties of the obtained composite are not improved even though blending the modified cellulose with polyester.

Example 6

Example 6 was performed in the same manner as in Example 1, except that modified Cellulose oligomer (1) was replaced with modified Cellulose oligomer (5), obtaining Biodegradable polyester (6). Next, a dumbbell test piece of Biodegradable polyester (6) was formed by injection molding, and the tensile strength and elongation at break of the dumbbell test piece were measured. Furthermore, Biodegradable polyester (6) was subjected to a hot press and the result was cut to form Sample (10) (with a thickness about 100 μm, and a size of 5 cm×5 cm). Next, Sample (10) was subjected to a biodegradation test, and the result is shown in Table 5.

Example 7

Example 7 was performed in the same manner as in Example 1, except that 3 parts by weight of modified cellulose oligomer (1) was replaced with 5 parts by weight of modified Cellulose oligomer (6), obtaining Biodegradable polyester (7). Next, a dumbbell test piece of Biodegradable polyester (7) was formed by injection molding, and the tensile strength and elongation at break of the dumbbell test piece were measured. Furthermore, Biodegradable polyester (7) was subjected to a hot press and the result was cut to form Sample (11) (with a thickness about 100 μm, and a size of 5 cm×5 cm). Next, Sample (11) was subjected to a biodegradation test, and the result is shown in Table 5.

Example 8

Example 8 was performed in the same manner as in Example 7, except that the additional amount of modified Cellulose oligomer (6) was increased from 5 parts by weight to 10 parts by weight, obtaining Biodegradable polyester (8). Next, a dumbbell test piece of Biodegradable polyester (8) was formed by injection molding, and the tensile strength and elongation at break of the dumbbell test piece were measured. Furthermore, Biodegradable polyester (8) was subjected to a hot press and the result was cut to form Sample (12) (with a thickness about 100 ppm, and a size of 5 cm×5 cm). Next, Sample (12) was subjected to a biodegradation test, and the result is shown in Table 5.

Example 9

Example 9 was performed in the same manner as in Example 7, except that the additional amount of modified cellulose oligomer (6) was increased from 5 parts by weight to 25 parts by weight, obtaining Biodegradable polyester (9). Next, a dumbbell test piece of Biodegradable polyester (9) was formed by injection molding, and the tensile strength and elongation at break of the dumbbell test piece were measured. Furthermore, Biodegradable polyester (9) was subjected to a hot press and the result was cut to form Sample (13) (with a thickness about 100 μm, and a size of 5 cm×5 cm). Next, Sample (13) was subjected to a biodegradation test, and the result is shown in Table 5.

Example 10

Example 10 was performed in the same manner as in Example 6, except that modified Cellulose oligomer (5) was replaced with modified Cellulose oligomer (7), obtaining Biodegradable polyester (10). Next, a dumbbell test piece of Biodegradable polyester (10) was formed by injection molding, and the tensile strength and elongation at break of the dumbbell test piece were measured. Furthermore, Biodegradable polyester (10) was subjected to a hot press and the result was cut to form Sample (14) (with a thickness about 100 μm, and a size of 5 cm×5 cm). Next, Sample (14) was subjected to a biodegradation test, and the result is shown in Table 5.

Example 11

Example 11 was performed in the same manner as in Example 6, except that modified Cellulose oligomer (5) was replaced with modified Cellulose oligomer (8), obtaining Biodegradable polyester (11). Next, a dumbbell test piece of Biodegradable polyester (11) was formed by injection molding, and the tensile strength and elongation at break of the dumbbell test piece were measured. Furthermore, Biodegradable polyester (11) was subjected to a hot press and the result was cut to form Sample (15) (with a thickness about 100 μm, and a size of 5 cm×5 cm). Next, Sample (15) was subjected to a biodegradation test, and the result is shown in Table 5.

Example 12

Example 12 Example 6 was performed in the same manner as in, except that modified Cellulose oligomer (5) was replaced with modified Dextrin (2), obtaining Biodegradable polyester (12). Next, a dumbbell test piece of Biodegradable polyester (12) was formed by injection molding, and the tensile strength and elongation at break of the dumbbell test piece were measured. Furthermore, Biodegradable polyester (12) was subjected to a hot press and the result was cut to form Sample (16) (with a thickness about 100 μm, and a size of 5 cm×5 cm). Next, Sample (16) was subjected to a biodegradation test, and the result is shown in Table 5.

TABLE 5

| | modified saccharide oligomer:polyester (1) | average degree of substitution of modified cellulose oligomer | tensile strength (GPa) | elongation at break (%) | weight loss (%) |
|---|---|---|---|---|---|
| Example 6 | 3:100 | 1.5 | 20.6 | 460 | 10.7 |
| Example 7 | 5:100 | 1.8 | 20.4 | 477 | 11.2 |
| Example 8 | 10:100 | 1.8 | 13.5 | 189 | 12.4 |
| Example 9 | 25:100 | 1.8 | 12.5 | 97 | 15.3 |
| Example 10 | 3:100 | 0.8 | 22.3 | 396 | 8.6 |
| Example 11 | 3:100 | 1.9 | 20.8 | 390 | 8.9 |
| Example 12 | 3:100 | 1.8 | 21.2 | 405 | 10.2 |

As shown in Table 5, the mechanical properties and biodegradability of the obtained polyester is modified by adjusting the amount of modified cellulose oligomer.

The samples of Examples 4-6 and Comparative Example 1 were subjected to a biodegradation test at high temperature, as shown in Table 6. The biodegradation test at high temperature included following steps. A potting soil (commercially available from Fwusow Industry Co., Ltd., with a trade number of organic soil mixture (7-03)) and a fertilizer (commercially available from Fwusow Industry Co., Ltd. with a trade number of normal compost (5-10)) were mixed, wherein the weight ratio of the potting soil to fertilizer was 3:1. Next, deionized water was added into the mixture, obtaining a soil for biodegradation test (with a pH value of about 6-7), wherein the water content of the solid was 50 wt %, based on the weight of the soil for biodegradation test. Next, the sample was disposed in the soil and all the surface of the sample contacted the soil. After disposing the sample in the soil at 37° C. and RH=85% for 12 weeks, the sample was cleaned and weighed to measure the weight loss.

TABLE 6

| | weight loss (%) |
|---|---|
| Comparative Example 1 | 20.3 |
| Example 4 | 59.7 |
| Example 5 | 61.2 |
| Example 6 | 80.4 |

As shown in Table 6, in comparison with the conventional biodegradable polyester, the biodegradable properties of the biodegradable polyester of the disclosure is also obviously improved in a composting environment at a relatively high temperature.

Example 13

5 parts by weight of modified Cellulose oligomer (1) and 100 parts by weight of Polyester (2) were mixed. Next, the mixture was reacted at 200° C. to perform a melt reaction for 1.5 hours, obtaining Biodegradable polyester (13). Next, a dumbbell test piece of Biodegradable polyester (13) was formed by injection molding, and the tensile strength and elongation at break of the dumbbell test piece were measured. Furthermore, Biodegradable polyester (13) was subjected to a hot press and the result was cut to form Sample (17) (with a thickness about 100 μm, and a size of 5 cm×5 cm). Next, Sample (17) was subjected to a biodegradation test, and the result is shown in Table 7.

Example 14

Example 14 was performed in the same manner as in Example 13, except that the additional amount of modified Cellulose oligomer (1) was increased from 5 parts by weight to 10 parts by weight, obtaining Biodegradable polyester (14). Next, a dumbbell test piece of Biodegradable polyester (14) was formed by injection molding, and the tensile strength and elongation at break of the dumbbell test piece were measured. Furthermore, Biodegradable polyester (14) was subjected to a hot press and the result was cut to form Sample (18) (with a thickness about 100 μm, and a size of 5 cm×5 cm). Next, Sample (18) was subjected to a biodegradation test, and the result is shown in Table 7.

Comparative Example 5

A dumbbell test piece of 100 parts by weight of Polyester (2) was formed by injection molding, and the tensile strength and elongation at break of the dumbbell test piece were measured. Furthermore, Polyester (2) was subjected to a hot press and the result was cut to form Sample (19) (with a thickness about 100 μm, and a size of 5 cm×5 cm). Next, Sample (19) was subjected to a biodegradation test, and the result is shown in Table 7.

TABLE 7

| | modified saccharide oligomer:polyester (2) | average degree of substitution of modified cellulose oligomer | tensile strength (GPa) | elongation at break(%) | weight loss (%) |
|---|---|---|---|---|---|
| Comparative Example 5 | — | — | 43.3 | 65.0 | 0.1 |
| Example 13 | 5:100 | 0.8 | 35.8 | 8.8 | 1.5 |
| Example 14 | 10:100 | 0.8 | 31.8 | 11.0 | 1.9 |

As shown in Table 7, in comparison with Comparative Example 5 (employing non-modified polyester), the biodegradable polyester of the disclosure exhibits greatly improved biodegradable properties.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A biodegradable polyester, which is a transesterification reaction product or esterification reaction product of a reactant (A) and a reactant (B), wherein the reactant (A) is a modified saccharide oligomer, and the reactant (B) is a polyester, or the reactant (B) consists of a dicarboxylic acid and a dihydric alcohol, wherein the modified saccharide oligomer is a reaction product of a saccharide oligomer and a modifier, and wherein the saccharide oligomer is dextrin, chitosan, or a combination thereof.

2. The biodegradable polyester as claimed in claim 1, wherein the modifier is a carboxylic acid, anhydride, siloxane having at least one reactive functional group, or a combination thereof, wherein the reactive functional group is acrylate group, methacrylate group, glycidyl group, oxiranyl group, oxetanyl group, or 3,4-epoxycyclohexyl group.

3. The biodegradable polyester as claimed in claim 1, wherein the modifier is formic acid, acetic acid, propionic acid, butyric acid, valeric acid, caproic acid, heptanoic acid, caprylic acid, benzoic acid, acetic anhydride, succinic anhydride, maleic anhydride, methylpropanoic anhydride, 3-dodecyloxolane-2,5-dione, tetradecylsuccinicanhydride, benzoic anhydride, 3-glycidyloxypropyl)trimethoxysilane, 3-glycidyloxypropyltriethoxysilane, 3-(trimethoxysilyl)propyl methacrylate, 3-(triethoxysilyl)propyl methacrylate, 3-(trimethoxysilyl)propyl acrylate, 3-(triethoxysilyl)propyl acrylate, [2-(3,4-epoxycyclohexyl)ethyl]trimethoxysilane, [2-(3,4-epoxycyclohexyl)ethyl]triethoxysilane, or a combination thereof.

4. The biodegradable polyester as claimed in claim 1, wherein the weight ratio of the reactant (A) to the reactant (B) is 1:100 to 30:100.

5. The biodegradable polyester as claimed in claim 1, wherein the modified saccharide oligomer has a weight average molecular weight of 500 to 15,000.

6. The biodegradable polyester as claimed in claim 1, wherein each anhydroglucose unit (AGU) of the modified saccharide oligomer has an average degree of substitution from 0.5 to 2.5.

7. The biodegradable polyester as claimed in claim 1, wherein the modified saccharide oligomer comprises a saccharide oligomer having at least one repeating unit of Formula (I), a saccharide oligomer having at least one repeating unit of Formula (II) or a combination thereof Formula (I)

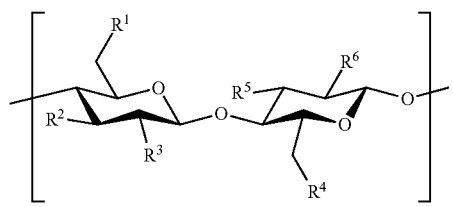

Formula (II)

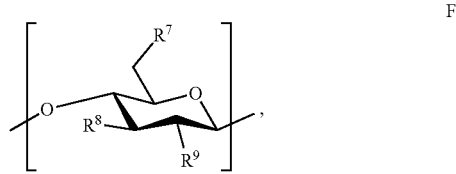

wherein $R^3$ and $R^4$ are —NH$_2$, and $R^1$, $R^2$, $R^5$, $R^6$, $R^7$, $R^8$ and $R^9$ are independently —OH, —NH$^2$,

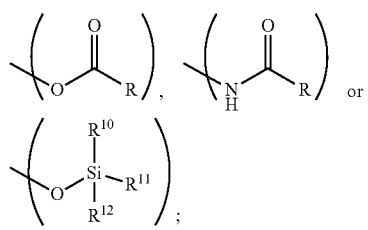

at least one of $R^1$, $R^2$, $R^5$, and $R^6$ is

-continued

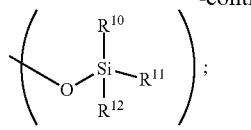

at least one of $R^7$, $R^8$ and $R^9$ is

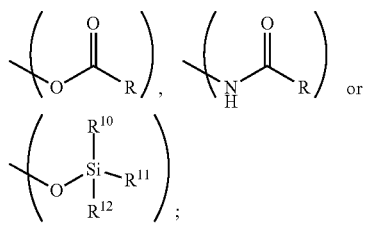

R is hydrogen, $C_{1-8}$ alkyl group, aryl group or $C_{2-18}$ carboxyl group; $R^{10}$, $R^{11}$ and $R^{12}$ are independently $C_{1-8}$ alkyl group, $C_{1-8}$alkoxy group or —(Z—$R^{13}$); is single bond, unsubstituted $C_{1-8}$ alkylene group or substituted $C_{2-8}$ alkylene group; when Z is substituted $C_{2-8}$ alkylene group, wherein at least one —CH$_2$— of $C_{2-8}$ alkylene group is replaced with —O—, —CO—, —OCO—, —COO—, —CONH—, or —NHCO—; $R^{13}$ is acrylate group, methacrylate group, glycidyl group, oxiranyl group, oxetanyl group, 3,4-epoxycyclohexyl group, or glycidyloxypropyl group; and at least one of $R^{10}$, $R^{11}$, and $R^{12}$ is —(Z—$R^{13}$).

8. The biodegradable polyester as claimed in claim 1, wherein the dicarboxylic acid is a compound having a structure represented by Formula (III), and the dihydric alcohol is a compound having a structure represented by Formula (IV)

Formula (III)

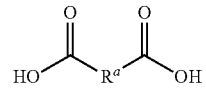

Formula (IV)

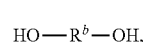

wherein $R^a$ and $R^b$ are independently unsubstituted $C_{1-8}$ alkylene group or phenylene group.

9. The biodegradable polyester as claimed in claim 1, wherein the molar ratio of the dicarboxylic acid to the dihydric alcohol is 1.2:1 to 1:1.2.

10. The biodegradable polyester as claimed in claim 1, wherein the polyester has at least one repeating unit of Formula (V)

Formula (V)

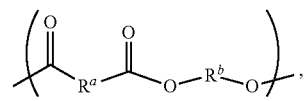

wherein $R^a$ and $R^b$ are independently unsubstituted $C_{1-8}$ alkylene group or phenylene group.

11. The biodegradable polyester as claimed in claim 1, wherein the polyester has a weight average molecular weight of 500 to 100,000.

12. The biodegradable polyester as claimed in claim 1, wherein the polyester is polybutylene succinate (PBS), polybutylene succinate adipate (PBSA), polyethylene succinate (PES), polybutylene adipate/terephthalate (PBAT), or a combination thereof.

* * * * *